United States Patent
Prohaska et al.

(10) Patent No.: US 6,420,062 B1
(45) Date of Patent: Jul. 16, 2002

(54) DOUBLE LAYER CATHODE FOR MOLTEN CARBONATE FUEL CELLS AND METHOD FOR PRODUCING THE SAME

(75) Inventors: Armin Prohaska, Ehingen; Manfred Bischoff, Feldkirchen; Bernd Rohland, Ulm; Vojtech Plzak, Plochingen, all of (DE)

(73) Assignee: MTU Motoren-und Turbinen-Union Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 09/424,428
(22) PCT Filed: May 19, 1998
(86) PCT No.: PCT/EP98/02929
  § 371 (c)(1),
  (2), (4) Date: Feb. 23, 2000
(87) PCT Pub. No.: WO98/53513
  PCT Pub. Date: Nov. 26, 1998

(30) Foreign Application Priority Data

May 23, 1997 (DE) .......................... 197 21 546

(51) Int. Cl.⁷ .......................... H01M 4/88; H01M 4/90
(52) U.S. Cl. .......................................... 429/40
(58) Field of Search .............................. 429/18, 26, 34, 429/40

(56) References Cited

U.S. PATENT DOCUMENTS

| | | | | |
|---|---|---|---|---|
| 4,206,270 A | * | 6/1980 | Kunz | 429/40 |
| 4,436,794 A | * | 3/1984 | Takeuchi | 429/40 |

* cited by examiner

Primary Examiner—Gabrielle Brouillette
Assistant Examiner—Mark Ruthkosky
(74) Attorney, Agent, or Firm—Crowell & Moring LLP

(57) ABSTRACT

The invention relates to a double layer cathode for molten carbonate fuel cells, containing a first layer (2a) consisting of a first cathode material, preferably lithium-treated nickel oxide, and a second layer (2b) consisting of cerium-activated lithium cobaltite. The inventive double layer cathode is characterised in that the polarization resistance is less dependent on temperature and in that it has a longer life. The double layer cathode is especially suitable for operating a fuel cell at less than 650° C. The material for the second cathode layer (2b) is produced by activating cobalt oxide by co-precipitation with cerium and treating it with lithium carbonate to form a suspension. Said suspension is then applied to the first cathode layer (2a) as a second cathode (2b), dried and sintered at a high temperature.

21 Claims, 1 Drawing Sheet

DOUBLE LAYER CATHODE FOR MOLTEN CARBONATE FUEL CELLS AND METHOD FOR PRODUCING THE SAME

BACKGROUND OF THE INVENTION

The invention relates to a double layer cathode for molten carbonate fuel cells and to a method for producing the same.

Currently, cathodes made of porous nickel oxide which are doped with lithium are used for molten carbonate fuel cells. Because the electric resistance of nickel oxide is relatively low (0.05 Ohm×cm) and its electrocatalytic activity is high (exchange current density 0.8 mA/cm$^2$), such cathodes made of nickel oxide result in a good cell output. In addition, because of the low resistance, the cathode can be produced to be sufficiently thick—approximately 1 mm—, so that a uniform gas distribution is ensured. However, a disadvantage of cathodes made of nickel oxide consists of the fact that they do not have a sufficient resistance to corrosion.

In the case of cathodes made of nickel oxide, nickel oxide is dissolved on the electrolyte matrix produced of an LiAlO$_2$ carrier material and an electrolyte material, on which the electrolyte matrix, the cathode and the anode of the fuel cell are arranged. Nickel is transported into the electrolyte matrix and is deposited there as metallic nickel. In the course of time, this leads to an internal short circuit of the cell. The dissolving and depositing rate of the nickel oxide amounts to 2 to 4 micrograms per hour per square centimeter, whereby the useful life of the fuel cell is limited to approximately 10,000 hours. However, a useful life of at least 40,000 hours is a prerequisite for an economical utilization of the fuel cell technology.

Since, in addition, the solubility of the nickel oxide in the electrolyte material of the electrolyte matrix increases linearly with a rising carbon dioxide partial pressure, the economically particularly interesting pressure operation is excluded in the case of molten carbonate fuel cells with cathodes made of nickel oxide.

Furthermore, lithium cobaltite/nickel oxide double layer cathodes are also known which are arranged in the fuel cell such that the lithium cobaltite layer faces the electrolyte matrix and the nickel oxide layer faces away from it. Because of the insertion of the lithium cobaltite layer, these cathodes permit the lowering of the nickel depositing rate in the electrolyte matrix to less than 0.4 micrograms per hour per square centimeter and thus extending the useful life of the molten carbonate fuel cell to the above-mentioned required value. However, the disadvantage of such conventional lithium cobaltite/nickel oxide double layer cathodes is an increased temperature dependence of the polarization resistance which, in the case of a practical operation of molten carbonate fuel cells, contains temperature fluctuations between approximately 600° C. to 680° C., causes considerable fluctuations in the fuel cell output. In addition, by means of this type of double layer cathode, it is difficult to lower the average operating temperature of the fuel cells to a temperature of less than 650° C. because then the output or the efficiency will fall to such an extent that no effective heat-guided operation can be carried out. However, specifically the lowering of the medium operating temperature is necessary in order to reduce the hot corrosion of the current collectors (bipolar plates) manufactured of steel such that, by means of the entire fuel cell stack containing a larger number of fuel cells, for example, 100 individual cells, the desired operating time of 40,000 hours can be achieved.

From German Patent Document DE 44 14 696 A1, double layer cathodes are known which have one layer on the basis of cobalt and one layer made of nickel oxide.

German Patent document DE 42 41 266 C1 shows cathode materials which are produced by the mixed precipitation of cobalt salts and alkaline earth salts, in which case mixed oxides are formed and an addition of powderized lithium oxide takes place with a subsequent sintering.

The abstract of the Japanese patent application from Derwent concerning Japanese Patent Document JP 09092294 A indicates that two-layer electrodes are known which have a first layer of cobalt oxide and ceroxide and a second layer of nickel.

From the abstract of the Japanese patent application in Derwent concerning Japanese Patent Document JP 05266892 A, electrode materials are known which are the result of the thermal treatment of mixtures of hydrous suspensions containing cobalt solutions and ceroxide.

SUMMARY OF THE INVENTION

It is therefore an object of the invention to provide a cathode for a molten carbonate fuel cell which has a longer useful life and a lower dependence on temperature.

According to the invention, it is provided that, in the case of such a process, a first cathode layer is formed from a first cathode material; a second cathode material is produced in that cobalt oxide is activated by means of a co-precipitation with cerium and is treated with lithium carbonate to form a suspension; the suspension of the second cathode material is applied as the second cathode layer onto the first cathode layer and is dried; and the formation produced from the two cathode layers is sintered at a raised temperature.

Thus, by means of the invention, a double layer cathode for molten carbonate fuel cells which is catalytically activated by means of cerium is created which has a significantly prolonged useful life. It is an important advantage of the double layer cathode produced according to the process of the invention that its polarization resistance has a lower temperature dependence and the fuel cell therefore has a higher output also at an operating temperature lowered to below 650° C. than in the case of a conventional double layer cathode.

The material of the first cathode layer advantageously consists of nickel.

For producing the second cathode material, lithium carbonate is advantageously added in a stoichiometric quantity to the cobalt oxide.

The suspension of the second cathode material is advantageously converted to lithium cobaltite during the sintering.

The sintering advantageously takes place at a temperature of between 500 and 700° C., more preferably at a temperature of between 550 and 650° C., and most preferably at a temperature of 600° C.

The suspension of the second cathode material is advantageously applied in a layer of a thickness of from 50 to 200 μm. The application of a layer of a thickness of between 80 and 150 μm is particularly advantageous.

According to a further development of the process according to the invention, it is provided that the co-precipitation of the cobalt oxide takes place by the mixed precipitation of cerium(III) nitrate/zirconyl nitrate/yttrium nitrate/cobalt nitrate solution. This permits an activation with cerium zirconium yttrium mixed oxide in the lithium cobaltite layer, whereby a further reduction is achieved of the absolute value of the polarization resistance of the cathode produced according to the process of the invention.

In the case of the double layer cathode produced according to the process of the invention, it is particularly advantageous that, when the fuel cells assembled in an operationally ready manner with the double layer cathodes are started, the cobalt contained in the second material is oxidized to form cobalt oxide and reacts with the lithium carbonate to form lithium cobaltite doped with ceroxide, and the nickel of the first cathode material is oxidized to nickel oxide and is lithium-treated. Thus, when the fuel cells are started, the cathode blank produced by means of the process according to the invention is brought into its final form.

Furthermore, the object is achieved according to the invention by a double layer cathode for molten carbonate fuel cells which is characterized in that the cathode contains a first layer consisting of a first cathode material and a second layer consisting of cerium-activated lithium cobaltite. The advantage of the double layer cathode according to the invention is a longer useful life than that of conventional cathodes for melting carbonate fuel cells and a lower temperature dependance of the polarization resistance with respect to conventional lithium cobaltite nickel oxide double layer cathodes.

The first cathode material preferably is lithium-treated nickel oxide.

According to a further development of the invention, it is provided that the cerium-activated lithium cobaltite layer of the double layer cathode according to the invention is activated with cerium/zirconium/yttrium/mixed oxide. Its advantage is a further reduction of the absolute value of the polarization resistance of the double layer cathode according to the invention.

In the following, embodiments of the invention will be explained by means of the drawing.

DETAILED DESCRIPTION OF THE INVENTION

Figure 1:
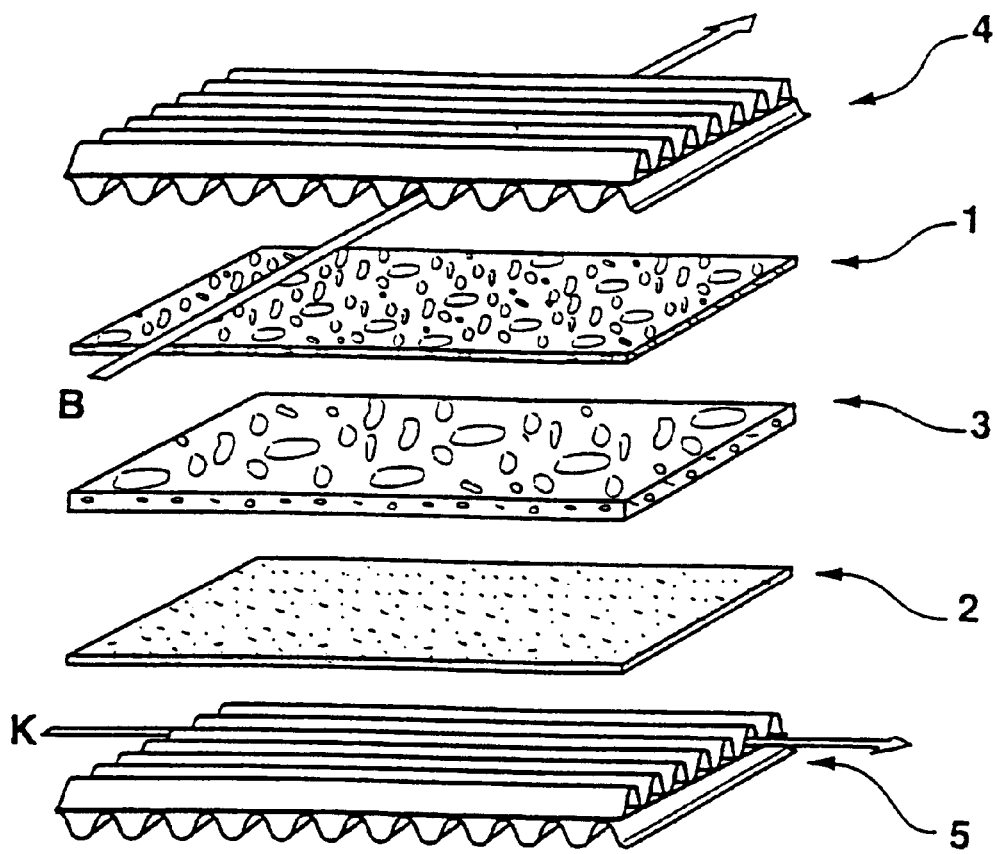
FIG. 1 is a perspective exploded view which shows the essential components of a molten carbonate fuel cell, in the case of which the double layer cathode according to the invention is used.

In the case of the fuel cell illustrated in FIG. 1, an electrolyte matrix 3, which is manufactured of an $LiAlO_2$ carrier material and an electrolyte material, is arranged between an anode 1 and a cathode 2. Respective bipolar plates 4, 5 are arranged on the anode 1 as well as on the cathode 2, which bipolar plates 4, 5 have the task of current collectors and are also used to provide a gas space in which the fuel gas B for the anode 1 and the cathode gas K for the cathode 2 is guided past the respective electrodes.

Figure 2:
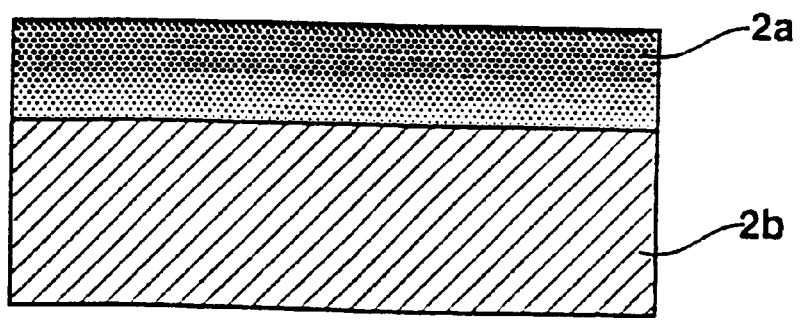
FIG. 2 is an enlarged sectional view of a portion of a double layer cathode, as it is used in the case of the fuel cell illustrated in FIG. 1.

The cutout, which is enlarged in FIG. 2, is a cross-sectional view of the cathode 2 of the fuel cell. This cathode consists of two layers, specifically a first layer 2a and a second layer 2b. The first layer 2a consists of a porous lithium-treated nickel oxide and faces away from the electrolyte matrix 3. The second layer 2b consists of porous cerium-activated lithium cobaltite and faces the electrolyte matrix 3. The first layer 2a made of nickel oxide has a good electronic conductivity, while the second layer 2b made of lithium cobaltite has a low temperature dependence of the polarization resistance and provides that the depositing rate of the nickel oxide in the electrolyte matrix 3 is low.

As an alternative, the second layer 2b may consist of porous cerium-activated lithium cobaltite which is activated by means of cerium/zirconium/yttrium/mixed oxide.

According to an embodiment of the process of the invention, for manufacturing the double layer cathode, the first cathode layer 2a is made of nickel. For producing the second cathode layer 2b, a second cathode material is formed in that cobalt oxide is activated by means of co-precipitation with cerium and is treated with lithium carbonate to form a suspension. The suspension of the second cathode material is applied as the second cathode layer 2b onto the first cathode layer 2a and is dried. The formation made of the two cathode layers is sintered at a raised temperature.

EXAMPLE 1

The lithium cobaltite layer 2b of the cathode is produced by means of co-precipitation with cerium-activated cobalt oxide. For this purpose, the latter is processed to form a suspension with a stoichiometric quantity of lithium carbonate and is applied onto the green nickel base foil 2a as a thin layer of a thickness of from 50 to 200 μm. After the drying, the formation produced in this manner is sintered in a reducing atmosphere at 600° C. to form a porous nickel/cobalt lithium carbonate plate.

EXAMPLE 2

The same approach is taken for producing the double layer cathode, with the exception that the co-precipitation of the cobalt oxide activated with cerium takes place by the mixed precipitation of cerium(III) nitrate/zirconyl nitrate/yttrium nitrate/cobalt nitrate solution. Thus, a double layer cathode with a second cathode layer 2b is obtained which has a cerium/zirconium/yttrium oxide doping of the lithium cobaltite layer.

EXAMPLE 3

For producing the material for the second cathode layer 2b, cobalt nitrate solution and cerium(IV) ammonium nitrate solution together with sodium carbonate solution are caused to flow into one another at a pH-value of 8, so that a cobalt oxide hydrate/ceroxide hydrate mixed precipitation is formed which has a large surface. This mixed precipitation is filtered, dried and calcined at 400° C. The resulting oxide powder is mixed with an amount of lithium carbonate power which is stoichiometric with respect to the cobalt oxide and is processed with a bonding agent and isopropanol in an ultraspeed mixer to form a drawable suspension. According to the Doctor-Blade process, this suspension is applied as a layer, which is 50 to 200 μm thin, to a green nickel base band used for producing the first cathode layer 2a, so that a green nickel/cobalt oxide/ceroxide double layer is created. This double layer is air-dried and is sintered at 600° C. in a reducing $N_2$—$H_2$—$CO_2$ gas atmosphere to form a porous metallic preliminary cathode material made of nickel/ceroxide/cobalt.

During the assembly of the fuel cells, the anode 1, which is filled with Li/K carbonate, the electrolyte matrix 3 and the double layer cathode 2, which still consists as a preliminary material, is assembled with the current collectors or bipolar plates 4, 5. During a specific heating operation, the cobalt of the preliminary cathode material is oxidized to cobalt oxide and reacts with the lithium carbonate to form lithium cobaltite doped with ceroxide. In the process, the nickel is oxidized to nickel oxide and treated with lithium.

In the normal-pressure operation, the operating form of the cerium-activated double layer cathode produced according to the invention has a lower polarization resistance than the non-activated double layer cathode and is particularly suitable for an operation at a raised pressure and at operating temperatures of less then 650° C.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for making double layer cathode precursor plates for molten carbonate fuel cells, comprising:

forming a first cathode layer from a first cathode material;

producing a suspension of a second cathode material by making a cerium-activated cobalt oxide by means of co-precipitation from salt solutions and processing with lithium carbonate to form the suspension;

applying the suspension of the second cathode material as the second cathode layer to the first cathode layer;

drying the second cathode layer; and sintering the first and second cathode layers in a reducing manner at 500° C. to 700° C., whereby double layer cathode precursor plates are made.

2. The process of claim 1, wherein the first cathode material comprises nickel.

3. The process of claim 1, wherein in producing the second cathode material, lithium carbonate is added to the cobalt oxide activated by means of cerium in a stoichiometric quantity required for the formation of lithium cobaltite.

4. The process of claim 2, wherein in producing the second cathode material, lithium carbonate is added to the cobalt oxide activated by means of cerium in a stoichiometric quantity required for the formation of lithium cobaltite.

5. The process of claim 1, wherein cobalt is formed during the reducing sintering.

6. The process of claim 4, wherein cobalt is formed during the reducing sintering.

7. The process of claim 1, wherein the sintering takes place at a temperature of between 550 and 650° C.

8. The process of claim 6, wherein the sintering takes place at a temperature of between 550 and 650° C.

9. The process of claim 1, wherein the sintering takes place at a temperature of 600° C.

10. The process of claim 8, wherein the sintering takes place at a temperature of 600° C.

11. The process of claim 1, wherein the suspension of the second cathode material is applied with a thickness of from 50 to 200 $\mu$m.

12. The process of claim 10, wherein the suspension of the second cathode material is applied with a thickness of from 50 to 200 $\mu$m.

13. The process of claim 1, wherein the suspension of the second cathode material is applied with a thickness of from 80 to 150 $\mu$m.

14. The process of claim 12, wherein the thickness is between 80 and 150 $\mu$m.

15. The process of claim 1, wherein the co-precipitation of the cobalt oxide takes place by mixed precipitation of a cerium (III) nitrate/zirconyl nitrate/yttrium nitrate/cobalt nitrate solution.

16. The process of claim 14, wherein the co-precipitation of the cobalt oxide takes place by a mixed precipitation of cerium (III) nitrate/zirconyl nitrate/yttrium nitrate/cobalt nitrate solution.

17. A method for manufacturing/making double layer cathodes for use in molten carbonate fuel cells using the double lays cathode precursor plates produced by the process of claim 2, comprising:

oxidizing the cobalt contained in the second cathode material to cobalt oxide, said cobalt oxide reacts with the lithium carbonate to form ceroxide-doped lithium cobaltite during the start of the assembling of the fuel cells with the double layer cathode precursor plates;

oxidizing the nickel of the first cathode material to nickel oxide; and lithium-treating the nickel oxide with the lithium/potassium carbonate melt.

18. A double layer cathode for molten carbonate fuel cells, comprising:

a first layer consisting of a first cathode material; and a second layer consisting of cerium-activated lithium cobaltite.

19. The double layer cathode of claim 18, wherein the first cathode material is lithium-treated nickel oxide.

20. The double layer cathode of claim 18, wherein the cerium-activated lithium cobaltite layer is activated with cerium/zirconium/yttrium mixed oxide.

21. The double layer cathode of claim 19, wherein the cerium-activated lithium cobaltite layer is activated with cerium/zirconium/yttrium mixed oxide.

* * * * *